Sept. 8, 1953 J. W. GREENLEAF 2,651,135
ADJUSTABLE WEIGHT FISHING SINKER
Filed Oct. 24, 1950
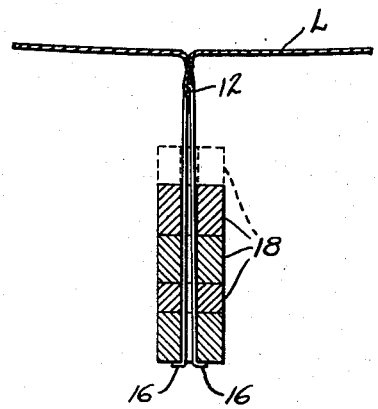
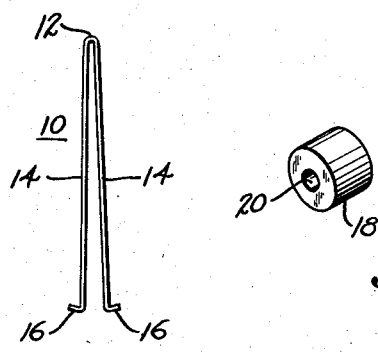
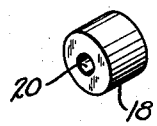
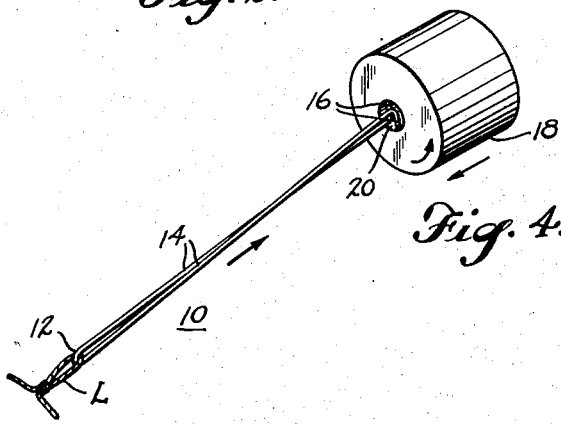
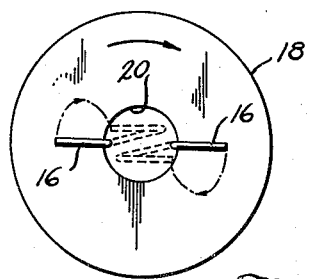
INVENTOR.
JACK W. GREENLEAF
BY
Reynolds, Beach & Christensen
ATTORNEYS Patented Sept. 8, 1953

2,651,135

UNITED STATES PATENT OFFICE 2,651,135

ADJUSTABLE WEIGHT FISHING SINKER

Jack W. Greenleaf, Snohomish, Wash.

Application October 24, 1950, Serial No. 191,785

4 Claims. (Cl. 43—43.14)

This invention relates to an adjustable weight fishing sinker and more particularly to one in which weight elements may be added and removed without disconnecting the sinker as a whole from the fishing line. The invention is herein illustratively described by reference to its preferred form as intended primarily for steelhead fishing, although it will be appreciated that certain modifications or variations therein may be employed for this type of fishing as well as for other types.

Because much of steelhead fishing is done in the winter months in cold climates, it is particularly desirable that all intricate manipulations, such as knot tying and the like in setting up and changing the fishing gear, be reduced to a minimum so that gloves may be worn if desired, or at least it will not be necessary to perform tedious operations with fingers which are numb from the cold. One of the problems in this regard has been to change the weight of sinkers conveniently as the fisherman moved along a river, for example, from one type of water to another. For instance in slowly moving water a somewhat lighter sinker is preferred than that which will be necessary in rapidly moving water. In either case, the sinker weight should be just sufficient to locate the bait at the bottom where the steelhead usually lie. If the weight is excessive the bait will not glide along the bottom as desired but the line will often hang up on a rock or other obstacle. Except to the most experienced fisherman the correct selection of sinker weight is a matter of cut and try experimentation, adding and subtracting sinker weight until the desired result is obtained. To save time, therefore, a quickly manipulated adjustable weight sinker is highly desirable.

With these and other considerations in view, my present invention is directed to the provision of an improved adjustable weight sinker permitting changes in any selected amount to be made in the weight of the sinker both rapidly and conveniently.

Another and more specific object is the provision of such a sinker in which the manipulation necessary for releasing or unlocking a weight element at will for removal from the weight element holder is simple and direct, yet cannot be accomplished by accident or normally by any of the forces which might be exerted upon any of the sinker elements in the water or in the handling of the fishing gear.

Another object of the invention is an extremely inexpensive adjustable weight sinker and furthermore one which is highly durable. Still another object is an inexpensive adjustable weight sinker in which a wide variation in the weight of the sinker may be readily obtained without disconnecting the weight holder from the fishing line.

In attaining these objects, my present invention in its preferred and herein illustrated form comprises a weight holder of resilient lightweight wire and one or more weight elements adapted to be installed removably thereon. The wire is formed generally in the shape of a sharp V or fork and its tine ends bent sharply outward to form short transverse weight-retaining stops or feet. With the fishing line attached to the apex of the V or fork shank, weight elements of any desired size or number are applied to the holder by threading both tines of the forked holder through them. For this purpose such weight elements have circular openings or bores therein of a diameter to pass the transversely bent ends of the holder tines when such tines are sprung together transversely to dispose such transverse ends in side-by-side relationship enabling them to pass through a weight element bore. The bore diameter is preferably just slightly in excess of the transverse dimension of the bent tine ends. When thus passed fully through the weight element bore such bent tine ends are urged apart and thereby out of registry with the bore so that they may function as retaining elements preventing the weight element from sliding off the holder.

However, by pulling on the end weight element relative to the holder and at the same time rotating the weight element about the holder the frictional drag between the weight-retaining tine ends and the abutting end face of the weight element causes such tine ends to be carried oppositely and away from each other with progressive rotation of the weight element. Upon approaching a generally side-by-side positional relationship such retaining feet are forced automatically inward toward each other until they slip off the bore rim to enter the bore, whereupon the weight element may be withdrawn directly from the holder.

Thus by a simple operation of slightly rotating the weight element and pulling the same relative to the holder, the weight element may be removed directly therefrom. However, such rotational movement accompanied by axial pull would not under normal conditions be exerted accidentally to result in loss of weight elements.

Figure 1 is a longitudinal section of the fishing sinker fastened to a fishing line.

Figure 2 is a side view of the sinker weight holder.

Figure 3 is a perspective view of a sinker weight element.

Figure 4 is a perspective view illustrating the preferred technique for installing a sinker weight element on the holder when the latter is fastened to a fishing line.

Figure 5 is an enlarged end view of the sinker illustrating the action by which a weight element is removed from the sinker holder.

As shown in Figure 2 the sinker weight element holder 10 comprises a piece of wire preferably of resilient metal such as stainless steel which is formed in the shape of a sharp V or fork. The apex portion of the V or more generally the shank portion 12 of the fork constitutes an eye or loop for fastening the holder to the fishing line L such as in the manner illustrated in Figure 1. The tine portions 14 of the fork-shaped holder are generally straight and normally diverge from the shank portion 12 at a small acute angle. Their projecting end portions are turned sharply outward or oppositely at an angle preferably slightly in excess of 90° to form weight-retaining stops or feet 16.

A preferred form of weight element appears in Figure 3, comprising a right cylinder 18 of lead or similar metal having a central axial bore 20 therein of a diameter determined by considerations which will appear shortly herein.

As shown in Figure 1, the fishing sinker is made up of the holder 10 and one or more of the weight elements 18 which may vary in size and in numbers assembled on the holder in accordance with the desired total weight of the sinker. In their installed position on the holder the weight elements are retained against sliding off the ends of the holder tines 14 by the retaining feet 16. These feet or stops are normally maintained spread apart and out of registry with the bore in the lowermost weight element as a result of the resilient spreading action of the holder wire. Consequently a simple direct axial pull on the weight elements tending to slip them over the feet 16 will have no effect as no force results which would tend to displace such feet transversely and into registry with the bore.

On the other hand, when the loop or shank portion 12 of the holder is grasped in one hand and held against rotation about the general longitudinal axis of the holder and a relative pull is simultaneously exerted on the lowermost weight element, accompanied by rotation thereof about such axis, frictional drag between the lower end face of such weight element and the feet 16 bearing thereon will cause the latter to move oppositely in arcuate paths. As such relative rotation continues the feet first progressively separate and then, as they approach transverse alignment or side-by-side relationship, approach each other. Finally, after such rotation has progressed through about 90° these retaining elements 16 are forced transversely inward by friction far enough to slip into the bore. The tips of the feet 16 follow curved paths generally indicated by the dot-dash lines in Figure 5.

The length of the retaining elements or feet 16 is preferably just slightly less than the diameter of the bore in the weight element, so that when swung into such side-by-side relationship they will then pass freely through the bore to permit removal of the weight element from the holder, as indicated by dotted lines in Figure 5. Removal of weight elements is thereby accomplished by a simple quick axial pull and twist of each weight element relative to the holder and consumes negligible time.

In order to install a weight element on the end of the holder conveniently without detaching the latter from the fishing line, the tip of one of the feet 16 is placed against the wall of the weight element bore just inside its rim. Thereupon the weight element is rotated just slightly relative to the holder, in order to obtain slight offset of the other foot relative to the first. At the same time the tines are sprung toward each other to bring the feet 16 into side-by-side relationship and thereby both into registry with the bore so they may then be pressed through the bore to install the weight element on the holder by thrusting them together axially, as illustrated in Figure 4.

It will be evident, therefore, that the operations of installing and removing individual weight elements from the holder are simple and that any desired sinker weight is readily obtained, from a sinker of negligible weight in which the holder carries no weight elements to a maximum weight condition in which the holder carries a full number of weight elements stacked along substantially its entire length.

I claim as my invention:

1. A fishing sinker comprising, in combination, a weight holder formed of a piece of resilient wire reversely bent substantially at the middle thereof to form a line-connecting loop and substantially straight legs extending normally in a slightly divergent relationship from said loop, the projecting ends of said legs carrying relatively short feet projecting oppositely from each other transversely to said legs, and a plurality of solid cylindrical weight elements having substantially central bores therein of a diameter slightly larger than the length of said weight holder feet and having opposite end faces, at least one of which is substantially flat, said end faces being transverse to the axis of the bores to form continuous rim surfaces extending around the opposite ends of said bores, respectively, said line-connecting loop being of a width to pass through said weight member bores, and the length of said legs being greater than the sum of the lengths of a plurality of said weight elements.

2. A fishing sinker comprising, in combination, a weight holder formed of a piece of resilient wire reversely bent substantially at the middle thereof to form a line-connecting loop and substantially straight legs extending normally in a slightly divergent relationship from said loop, the projecting ends of said legs carrying relatively short feet projecting oppositely from each other transversely to said legs, and a plurality of solid cylindrical weight elements having substantially central bores therein of a diameter slightly larger than the length of said weight holder feet and having opposite end faces, at least one of which is substantially flat, said end faces being transverse to the axis of the bores to form continuous rim surfaces extending around the opposite ends of said bores, respectively, and the length of said legs being greater than the sum of the lengths of a plurality of said weight elements.

3. A fishing sinker comprising, in combination, a weight holder formed of a piece of resilient wire reversely bent substantially at the middle thereof to form a line-connecting loop and substantially straight legs extending normally in a slightly divergent relationship from said loop, the projecting ends of said legs carrying relatively short feet projecting oppositely from each other transversely to said legs, and a solid cylindrical weight element having a substantially central bore therein of a diameter slightly larger than the length of said weight holder feet and having opposite end faces, at least one of which is substantially flat, said end faces being transverse of the axis of said bore to form continuous rim surfaces extending around the opposite ends of said bore, respectively.

4. A fishing sinker comprising, in combination, a weight holder formed of a piece of resilient wire reversely bent substantially at the middle thereof to form a line-connecting loop and substantially straight legs extending normally in a slightly divergent relationship from said loop, the projecting end of at least one of said legs carrying a relatively short foot projecting outwardly from the other leg, and a plurality of solid cylindrical weight elements having substantially central bores therein of a diameter slightly larger than the length of said weight holder foot and having opposite end faces, at least one of which is substantially flat, said end faces being transverse to the axis of the bores to form continuous rim surfaces extending around the opposite ends of said bores, respectively, and the length of said legs being greater than the sum of the lengths of a plurality of said weight elements.

JACK W. GREENLEAF.

References Cited in the file of this patent

UNITED STATES PATENTS

| Number | Name | Date |
|---|---|---|
| Re. 4,115 | Lacy | Sept. 6, 1870 |
| 1,232,167 | Arnold | July 3, 1917 |
| 1,500,463 | Mattern | July 8, 1924 |
| 1,564,147 | Stickley et al. | Dec. 1, 1925 |
| 2,014,027 | Neuhausen | Sept. 10, 1935 |
| 2,074,057 | Kempe | Mar. 16, 1937 |
| 2,121,279 | Beck | June 21, 1938 |